UNITED STATES PATENT OFFICE.

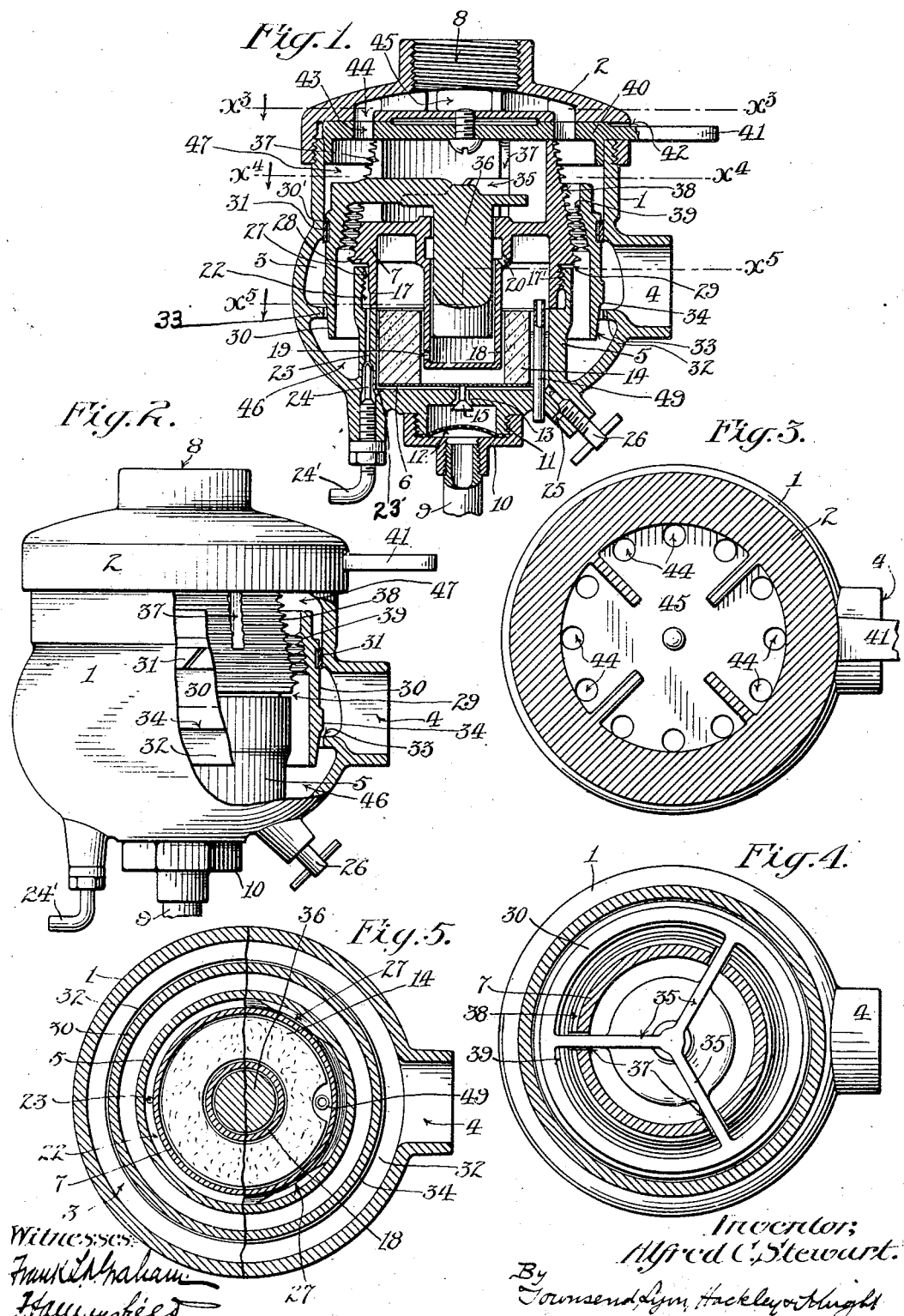

ALFRED C. STEWART, OF LOS ANGELES, CALIFORNIA.

CARBURETER.

No. 877,136.

Specification of Letters Patent.

Patented Jan. 21, 1908.

Application filed March 7, 1906. Serial No. 304,651.

*To all whom it may concern:*

Be it known that I, ALFRED C. STEWART, a citizen of the United States, residing at Los Angeles, in the county of Los Angeles and State of California, have invented a new and useful Improvement in Carbureters, of which the following is a specification.

This invention relates to an improvement on the carbureter disclosed in my application, Serial No. 244,337, filed Feb. 6, 1905, the main object of the present invention being to make the carbureter more compact, simple and cheap.

A further object of the invention is to provide for more effectual vaporization of the oil and intermingling thereof of the mixture.

The accompanying drawings illustrate the invention.

Figure 1 is a vertical section. Fig. 2 is a side elevation partly broken away. Fig. 3 is a section on the line $x^3$—$x^3$ in Fig. 1. Fig. 4 is a section on the line $x^4$—$x^4$ in Fig. 1. Fig. 5 is a section on the line $x^5$—$x^5$ in Fig. 1.

The device comprises a casing or body 1 formed substantially as an open topped cup having a cylindrical upper portion screw-threaded to receive a screw cap 2 and having a rounded lower portion which is bowed or swelled outwardly from the upper portion to form the outer wall of an air inlet chamber 3, said chamber communicating with the outer air through an inlet opening 4. A flange 5 extending up from the bottom of body 1 forming an interior oil chamber 6, closed at the top by a screw plug 7. An outlet duct or opening 8 is formed in the cap or cover 2 and communicates with the intake of an explosion engine or other means for producing suction through said opening.

9 designates the oil supply pipe entering a screw collar 10 screwing onto a chamber 11 at the bottom of the body 1, and a strainer 12 being placed at the bottom of said chamber and held in place by the screw collar 10. The bottom of the body 1 has a duct or opening 13 establishing communication from the pipe 9 to the oil chamber 6. Oil chamber 6 contains a float 14 carrying a valve 15 for closing or opening the duct 13, to maintain a definite level of oil in said chamber. Screw plug 7 has an annular flange 17 which is screw-threaded at 17' to engage a screw thread on the inner face of the annular flange 5, said screw-threaded portion of the flange 5 being of larger diameter than the lower portion of the flange so that the inner faces of the flanges 5 and 16 form a continuous cylindrical surface or wall for the oil chamber, wherein a float 14 rises and falls. The plug 7 also has a central depending tubular chamber 18 extending to near the bottom of the oil chamber, the float 14 being annular to fit and slide on said tubular portion of the plug. Said tubular portion is perforated as at 19, 20, to enable retarded movement of the valve spindle means therein as hereinafter set forth, these elements acting as a dash pot. Flange 5 is recessed below the screw-threaded portion 17 to form an annular oil passage 22 which communicates with the oil chamber through a duct 23 leading from said passage 22 downwardly in the flange 5 and communicating laterally by a duct 23' with the lower part of the oil chamber, a needle valve 24 being provided to close, open, or regulate said duct, said valve having a handle 24

25 designates an outlet or drainage duct for the oil chamber having a screw closure 26. From the annular passage 22 one or more ducts 27 lead upwardly through the screw-threaded portion 17' to the top of flange 5, and the screw plug 7 has a shoulder 28 which extends outwardly over the top of the flange 5 and sufficiently above the same to form a narrow annular oil discharge slit 29 which communicates with the passage 22 through the ducts 27 aforesaid. Said ducts 27 are formed by flattening or cutting away the threads 17 on the inner flange 16.

The valve member 30 is tubular and slides within the cylindrical upper portion of the body 1, a split packing ring 31 fitting in an annular groove 30' in said valve member. This valve member separates the air inlet or supply chamber 3 from the mixing chamber 46, the tubular valve wall forming the inner wall of the chamber 3 and the outer wall for the upper portion of chamber 46. At its lower end the tubular valve member has an upwardly flaring peripheral portion 32 which enters within the circular valve seat 33 formed as a flange extending inwardly from the swelled out portion of the body 1 below the inlet chamber 4, the space between this flared valve portion and the said seat forming an annular air inlet. Above said flared portion the valve member has a shoulder 34 which, when the valve is lowered, comes against the top of the seat ring to close the inlet. At its upper end the valve member is provided with arms 35 forming a spider connecting it to a cylindrical spindle 36 which travels vertically in the tubular chamber 18 within the oil chamber, whereby the valve is guided in its vertical movement. The arms 35 work in vertical slots 37 in the upper portion of the screw plug 7, said upper portion being formed as an annular flange in which said slots extend radially. The outer face of the tubular plug 7 and the opposing inner face of the valve member 30 are formed with upwardly tapering deflector faces 38, 39, so that as the valve member is raised or lowered, the distance between said members is increased or decreased. Said surfaces are also preferably grooved or provided with annular horizontal ridges as indicated, to increase the surface exposed to the mixture passing between the same and to baffle or deflect the mixture as it passes therethrough.

At the top of the casing means are provided for controlling the area of the outlet, said means consisting of a disk 40 pivoted centrally to the top member 2 and having an operating handle 41 extending through a slot 42 in the wall of the cap 2, said disk having a series of perforations 43 which in the angular movement of the disk move into and out of register with perforations 44 in the bottom of the cap 2, said perforations 44 communicating with a chamber 45 formed in the top of the cap 2 and opening into the outlet 8.

It will be seen that the casing 1 contains an interior oil chamber 6, an air inlet chamber 3 surrounding the oil chamber, a mixture chamber 46 extending around the oil chamber and within and below the air inlet chamber and the valve member 30, a suction chamber 47 above the mixing chamber and the valve, and an outlet chamber 45 above the suction chamber.

49 designates an overflow and vent tube extending through the bottom of casing 1 to the level of the liquid in the oil chamber.

The operation is as follows:—The device being connected to an oil supply at 9 and to a suctional connection, such as the intake of a gas engine at the outlet 8, each suctional impulse will draw a current of air through the inlet 4 into the chamber 3. The partial vacuum in the suction chamber 47 in the upper part of the casing 1 causes the valve member 30 to move upwardly in proportion to the amount of suction, opening the passage between the valve portion 32 and the valve seat 33 and between the valve deflector surfaces 38, 39, so that air can pass from the inlet 4 down through the air inlet between valve portions 32, 33, into the chamber 46 at the bottom of casing 1 and then upwardly within the valve member 30 and around the fixed flange 5 and between the valve surfaces 38, 39, and so into the chamber 47 at the top of the casing 1, from which it passes through the openings 44 into chamber 45 and the outlet 8. The oil passes in from pipe 9 into chamber 11 and through the duct 13 into the oil chamber 6, the float 14 serving to close the inlet communication at 13 when the oil chamber fills to a certain level, this level being substantially the level of the oil outlet 29, or slightly below the same, so that oil must be drawn through said outlet by suction. Valve 24 being open, oil flows through duct 23 from oil chamber 6 to passage 22 and thence through duct 23 to the annular oil outlet 29, the oil as it flows over the lip of said oil outlet 29 being caught and entrained by the upwardly passing current of air passing between the valve member 30 and the flange 5. Above this point where the oil is taken up by the air the passage contracts, the deflector faces 38, 39 being sufficiently close to cause acceleration of the mixture as it passes between them, and the ridges on said surfaces serve to baffle or deflect the mixture as it passes upwardly and insure more complete commingling and vaporization. The constriction of this outlet passage for the mixture is proportional to the constriction of the inlet passage for the air at the bottom of the valve, said valve as it moves upwardly opening both of said passages proportionately or correspondingly so that the velocity of exit remains approximately constant and uniform conditions of mixture are attained. It will be understood that the amount of oil flowing from the oil outlet will be proportional to the condition of suction existing at the oil outlet which is proportional to the suction at outlet 8. The upward lift of the valve member 30 is also proportional to the amount of this suction at outlet 8, the lift of the valve being due to the difference in pressure on the upper and lower portions thereof, and this difference in pressure being in direct correspondence with the suctional effect. The amount of air admitted is proportional to the upward movement of the valve as said upward movement increases the air inlet and mixture outlet to the valve so as to increase the amount of air passing in proportion to the suctional effect and therefore in proportion to the amount of oil supplied, without materially changing the velocity, so that the condition for substantially uniform mixture under all speeds and loads is attained.

What I claim is:—

1. A carbureter comprising an inner oil chamber provided with an inlet valve, a casing surrounding the oil chamber, an air inlet to said casing and provided with a valve seat, said oil chamber being provided with an outlet opening, a deflector above said outlet, and a valve surrounding the oil chamber and guided to move vertically in the casing and forming therewith and with the oil chamber an air inlet chamber and a mixing chamber, said valve having a portion coöperating with said valve seat and a deflector portion coöperating with the aforesaid deflector, to vary the size of the air inlet opening into the mixing chamber, and the outlet from the mixing chamber in correspondence.

2. A carbureter comprising an inner oil chamber provided with an inlet valve, a float automatically controlling said inlet valve, a casing surrounding the oil chamber, an air inlet to said casing and provided with a valve seat, said oil chamber being provided with an outlet opening, a deflector above said outlet, and a valve surrounding the oil chamber and guided to move vertically in the casing and forming therewith and with the oil chamber an air inlet chamber and a mixing chamber, said valve having a portion coöperating with said valve seat and a deflector portion coöperating with the aforesaid deflector, to vary the size of the air inlet opening into the mixing chamber, and the outlet from the mixing chamber in correspondence.

3. A carbureter comprising an inner oil chamber provided with an inlet valve, a casing surrounding the oil chamber, an air inlet to said casing and provided with a valve seat, said oil chamber being provided with an outlet opening, a deflector above said outlet, and a valve surrounding the oil chamber and guided to move vertically in the casing and forming therewith and with the oil chamber an air inlet chamber and a mixing chamber, said valve having a portion coöperating with said valve seat and a deflector portion coöperating with the aforesaid deflector, to vary the size of the air inlet opening into the mixing chamber, and the outlet from the mixing chamber in correspondence, and a suction chamber above the mixing chamber, the valve member being exposed in said suction chamber to be lifted by the suction therein.

4. A carbureter comprising an inner oil chamber provided with an inlet valve, a float automatically controlling said inlet valve, a casing surrounding the oil chamber, an air inlet to said casing and provided with a valve seat, said oil chamber being provided with an outlet opening, a deflector above said outlet, and a valve surrounding the oil chamber and guided to move vertically in the casing and forming therewith and with the oil chamber an air inlet chamber and a mixing chamber, said valve having a portion coöperating with said valve seat and a deflector portion coöperating with the aforesaid deflector, to vary the size of the air inlet opening into the mixing chamber, and the outlet from the mixing chamber in correspondence, and a suction chamber above the mixing chamber, the valve member being exposed in said suction chamber to be lifted by the suction therein.

5. A carbureter comprising a casing having an annular flange extending up from the bottom thereof, a plug screwed onto said flange to form an oil chamber within the flange, said plug and flange being formed with an annular oil outlet at the top of said flange, and with a duct leading to said outlet from the oil chamber, a valve for said duct, the casing having a circular valve extending inwardly toward the oil chamber, and a valve member sliding in the casing and having a tapering portion inwardly of said lip, and a tapering portion at its upper part, and a tapering deflector member supported in the casing adjacent to the upper tapering portion of the valve member.

6. A carbureter comprising a casing having a cylindrical upper part, an interior oil chamber in its lower part, a circular valve lip in its lower part and an annular valve member sliding in said cylindrical part and forming with the casing an air inlet chamber above said valve lip and coöperating with the valve lip to control passage of air from said air inlet chamber into the interior of the valve member, the casing being provided above the valve member with an exhaust outlet to apply suction to the space within the casing above the valve member to lift said member, said valve member opening upwardly into said space to allow suction of mixture into such space.

7. A carbureter comprising a casing having a cylindrical upper portion and a flange extending upwardly from its bottom forming a cylindrical oil chamber, a plug screwed into said flange and having a tubular portion extending downwardly into the oil chamber and perforated for the passage of oil therethrough, said flange and plug being formed with an annular passage at the top of said flange and with a duct leading to said passage from the oil chamber, a valve for said duct, an annular float in the oil chamber surrounding said tubular portion of the plug, a valve carried by said float, an oil supply chamber communicating with the oil chamber through an opening controlled by said valve, and a valve member slidable in the upper cylindrical portion of the casing and having a cylindrical extension working in the tubular portion of the plug.

8. A carbureter comprising a casing having a cylindrical upper portion and a flange extending upwardly from its bottom forming a cylindrical oil chamber, a plug screwed into said flange and having a tubular portion extending downwardly into the oil chamber and perforated for the passage of oil therethrough, said flange and plug being formed with an annular passage at the top of said flange and with a duct leading to said passage from the oil chamber, a valve for said duct, an annular float in the oil chamber surrounding said tubular portion of the plug, a valve carried and operated by said float, an oil supply chamber communicating with the oil chamber through an opening controlled by said float operated valve, and a valve member slidable in the upper cylindrical portion of the casing and having a cylindrical extension working in the tubular portion of the plug, the said plug being formed exteriorly with a ribbed upwardly tapering face and having its upper portion in the form of a vertically slotted flange, and the valve member having a spider portion extending in the slots of the plug and provided interiorly with an upwardly tapering ribbed portion opposing the ribbed portion of the plug.

In testimony whereof, I have hereunto set my hand at Los Angeles California this 26th day of February 1906.

ALFRED C. STEWART.

In presence of—
ARTHUR P. KNIGHT,
VERNA A. TALBERT.